United States Patent [19]

McGhee et al.

[11] Patent Number: 4,549,159
[45] Date of Patent: Oct. 22, 1985

[54] THERMOSTAT CONTROL APPARATUS

[75] Inventors: James B. McGhee, El Cajon; Thomas D. Tweedie, Monrovia, both of Calif.

[73] Assignee: Leslie C. Hill, San Diego, Calif.

[21] Appl. No.: 607,802

[22] Filed: May 7, 1984

[51] Int. Cl.⁴ .............................................. H01H 37/62
[52] U.S. Cl. ................................... 337/301; 337/305; 236/46 R
[58] Field of Search .............. 337/301, 302, 303, 305, 337/380, 381; 236/46 R

[56] References Cited

U.S. PATENT DOCUMENTS

| 4,016,402 | 4/1977 | Scott | 219/334 |
| 4,166,944 | 9/1979 | Scott | 219/330 |

*Primary Examiner*—Harold Broome
*Attorney, Agent, or Firm*—Brown, Martin & Haller

[57] ABSTRACT

Apparatus for controlling a water heater thermostat for increased efficiency in fuel usage. A mounting bracket is adapted to fit on several different common types of thermostat control boxes. In one embodiment the bracket removably receives a controller housing. In another embodiment the mounting bracket and the controller housing are a unitary structure. A motor in the housing is coupled to a slip ring engaging the thermostat knob to raise and lower the thermostat temperature setting in accordance with sensor actuated circuitry responsive to incoming and outgoing water temperature. The coupling enables the apparatus to accommodate thermostats with different size knobs and rotatable in opposite directions, in addition to coupling to various size thermostat housings.

12 Claims, 16 Drawing Figures

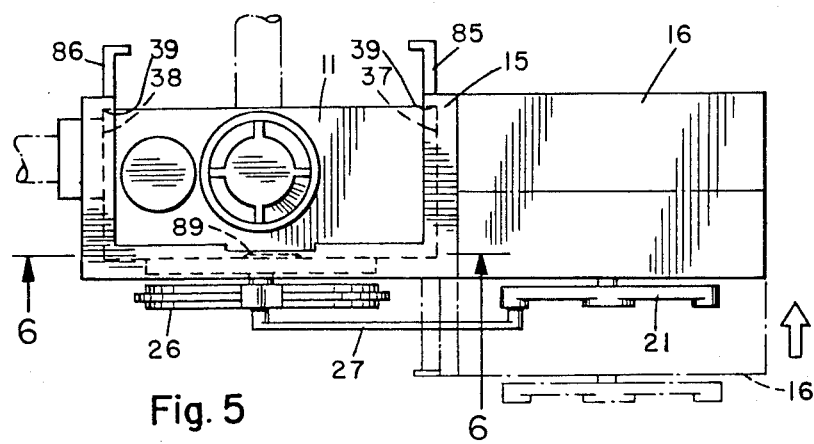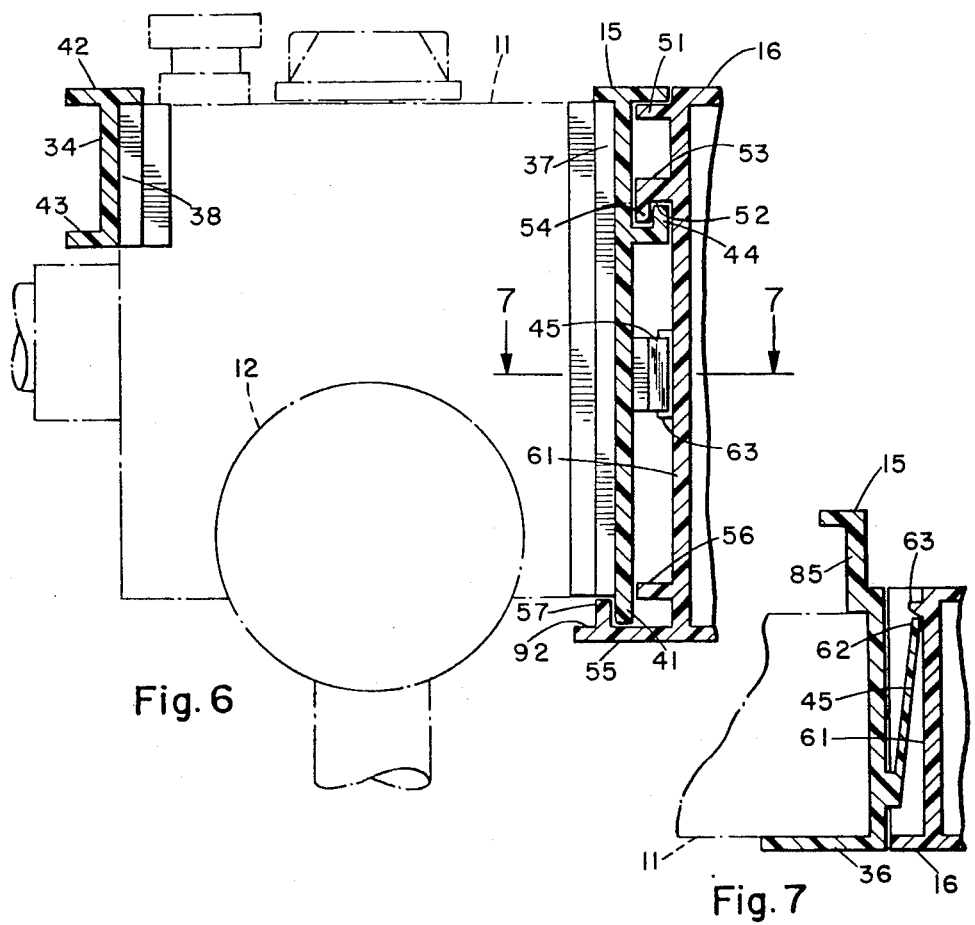

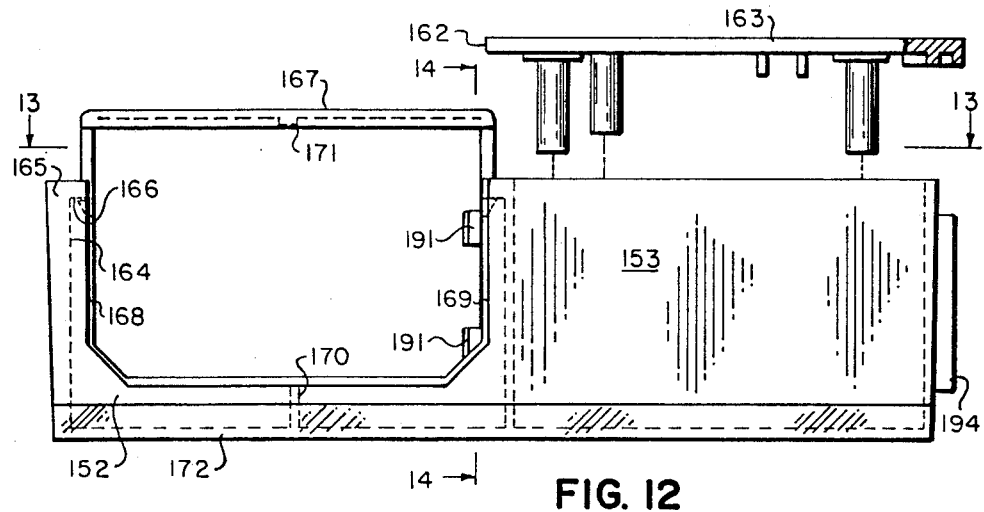
FIG. 12
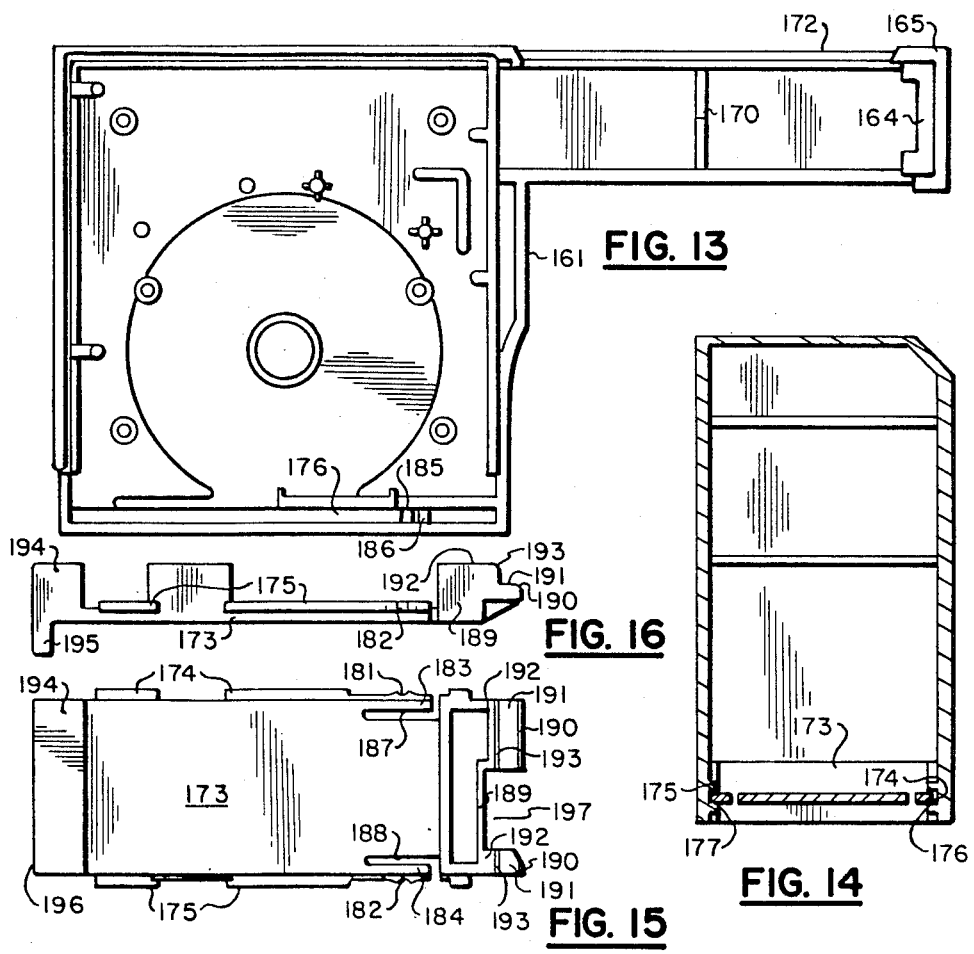
FIG. 13
FIG. 16
FIG. 15
FIG. 14

THERMOSTAT CONTROL APPARATUS

CROSS REFERENCE TO RELATED APPLICATION

This is related to co-pending application Ser. No. 517,725 filed July 27, 1983.

FIELD OF THE INVENTION

This invention relates generally to hot water heater controls and more particularly to apparatus for controlling the thermostat setting of a hot water heater for fuel economy.

DISCUSSION OF THE PRIOR ART

Typical water heater controls comprise a thermostat which is set at a desired high temperature and the temperature is maintained within a reasonable range of that setting. Even when there is no use of hot water, such as overnight or on weekends or during vacations when there is no hot water use at all, the burner ignites periodically to maintain the high temperature of the water in the tank.

Timer controls have been devised to adjust the water heater thermostat between low and high settings, based on predicted uses of hot water with respect to the time of day. These can be helpful in reducing fuel costs but they are not based on actual usage so the adjustments are somewhat arbitrary.

Systems have been devised which are responsive to the temperature in a water heater outflow line to control the setting of the heater thermostat dependent on water usage. During periods of heavy demand, the thermostat is set at a high level in order to reheat the water as quickly as possible. When the water temperature reaches a predetermined high level, a thermoswitch opens to cause the apparatus to reduce the thermostat setting to a relative low level. Short duration or momentary usages of hot water do not affect the apparatus so that there is an efficiency is not starting the burner until significant demand for hot water occurs.

Alternatively, thermoswitches may be mounted to both the outflow and supply lines to provide improved control based on hot water demand.

Examples of the control systems mentioned above are shown in U.S. Pat. Nos. 4,016,402, 4,166,944 and 4,413,775. The systems are fully described in these patents, but practical, efficient apparatus for converting a common water heater thermostat to be controlled by these fuel efficient systems, of the type disclosed herein, were not shown.

SUMMARY OF THE INVENTION

It is a primary object of this invention to adapt, in a practical manner, a system for controlling the thermostat of a water heater, depending on actual hot water usage, to be used with standard thermostat control structures.

A large percentage of residential thermostats for gas water heaters are of two varieties, each having a substantially rectangular housing with a round control knob on the front. These rectangular housings have different dimensions and one of the control knobs rotates clockwise while the other rotates counterclockwise to increase temperature. The knobs themselves are of different diameters.

This invention provides apparatus, including a mounting bracket, which is adapted to fit on both common types of thermostat control boxes and includes or removably receives a controller housing. In view of this disclosure, modifications may be made to accommodate additional water heater control configurations other than rectangular boxes and round knobs. The controller housing encloses a motor connected to a crank on the front of the housing. A slip ring appropriately shaped for the thermostat knob is slid over the knob and an elongated drive arm is removably coupled between the crank and the slip ring to couple the motor to the thermostat control knob.

The motor typically rotates in one direction at a relatively low speed such as one RPM. By appropriately configuring the crank, drive arm and slip rings, the motor can appropriately control both types of thermostats, after a predetermined delay in the system, to raise and lower the temperature based on usage of the hot water.

The apparatus includes a self-adjusting feature with respect to the slip rings so that the thermostat control knobs cannot be overdriven in either direction. Additionally, the interlocking apparatus between the mounting bracket and the separate controller housing includes biasing means to prevent one element from moving with respect to the other, together with means on the controller housing for preventing the bracket from being removed from the thermostat housing. In the unitary bracket and housing, a sliding lock retains the bracket on the thermostat. In both embodiments the thermostat housing is partially enclosed sufficiently to prevent movement of the bracket with respect to the housing.

BRIEF DESCRIPTION OF THE DRAWING

The objects, advantages and features of this invention will be more readily apparent from the following detailed description when read in conjunction with the accompanying drawing in which:

FIG. 5 is a top view of the apparatus of FIG. 1 showing the controller housing both partially and fully engaged on the mounting bracket;

FIG. 6 is a sectional view taken along line 6—6 of FIG. 5;

FIG. 7 is a sectional view taken on line 7—7 of FIG. 6;

FIG. 12 is a top plan view of the invention of FIG. 10 modified to fit the thermostat of second configuration and with the rear cover spaced slightly from its normal position;

FIG. 13 is a rear view from the location of arrows 13—13 of FIG. 12;

FIG. 14 is a sectional view taken along cutting plane 14—14 of FIG. 12;

FIG. 15 is a top plan view of a locking slide employed in the embodiment of FIG. 10; and FIG. 16 is a side view of the locking slide of FIG. 15.

DESCRIPTION OF THE PREFERRED EMBODIMENT

Figure 1:
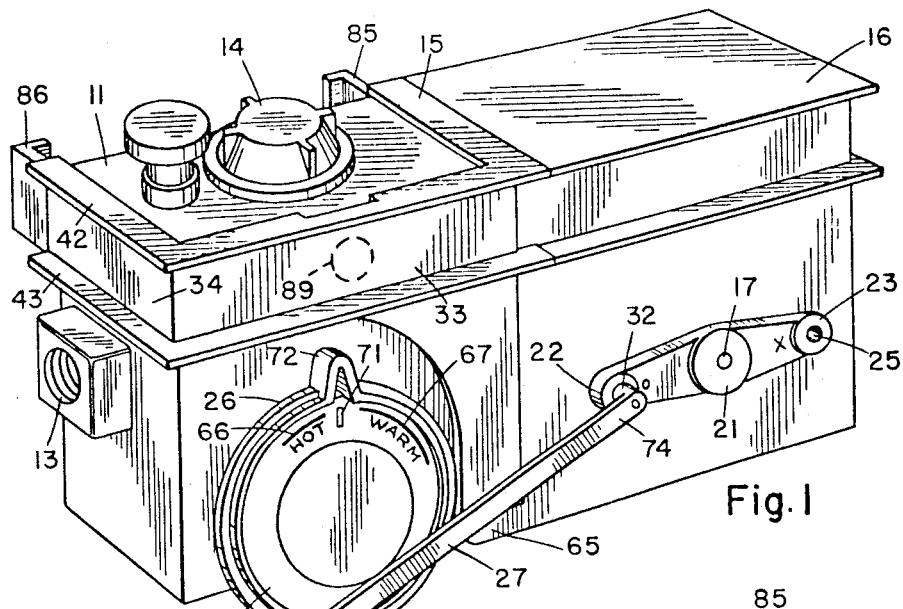
FIG. 1 is a perspective view of one embodiment of the apparatus of this invention mounted to a thermostat control box of a first configuration.

With reference now to the drawing and more particularly to FIG. 1 thereof, there is shown a thermostat control box 11 having a control knob 12. The particular thermostat shown is for a gas-fired water heater so incoming gas coupling 13 is shown along with pilot lighting apparatus 14. Any controllable thermostat may be controlled by the apparatus of this invention and the type of fuel used is unimportant.

Figure 3:
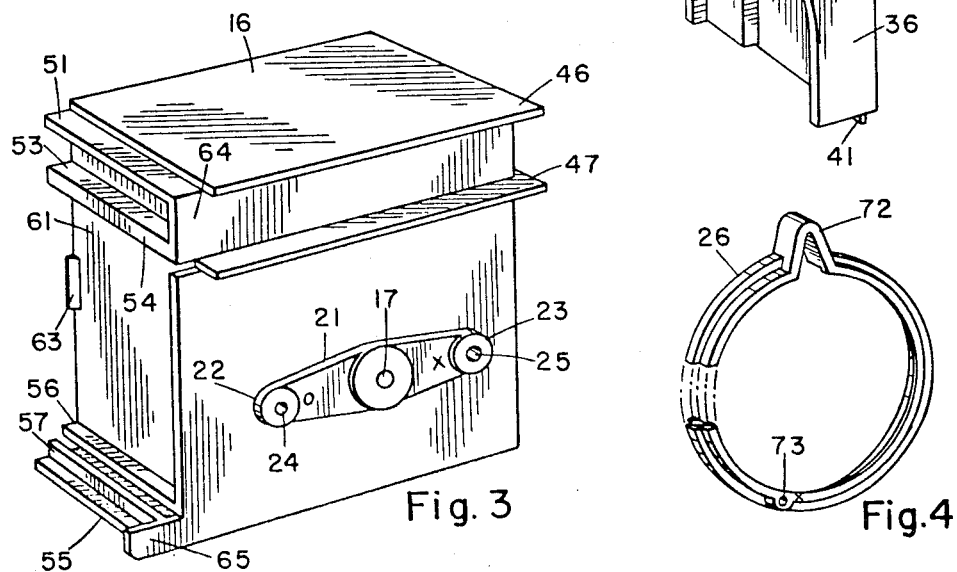
FIG. 3 is a perspective view of the controller housing shown in FIG. 1.

The embodiment of the present invention shown in FIG. 1 comprises a mounting bracket 15 removably, slidably mounted on control box 11. Controller housing 16 is removably mounted to bracket 15, also in a sliding manner. A motor 131, shown schematically in FIG. 9, within housing 16 has a shaft 17 extending outwardly from the housing to which crank 21 is mounted. The crank is elongated and formed with two bosses 22, 23 having respective bores 24, 25 therein (FIG. 3). For orientation purposes, as will be explained below, bores 24 and 25 are of different diameters. Drive ring 26 frictionally engages knob 12 and is coupled to crank 21 by means of drive arm 27. The drive arm is an elongated device having pins 31, 32 at either end which are adapted to fit in respective openings in the crank and the drive ring.

The apparatus of the invention will be discussed in greater detail with respect to FIGS. 2-7. Mounting bracket 15 has a front 33, a left side wing 34, a right side 35 and a lower partial front face 36. The bracket is adapted to engage control box 11 by sliding down over it so that the ends of the control box fit within depressions 37 and 38 (FIG. 5) on the right and left sides of the bracket respectively, confined at the rear by shoulders 39. This close fit, by which side-to-side and front-to-back relative motion of the bracket with respect to the control box is prevented, can be easily appreciated from the top view of FIG. 5. Front face 36 not only has the purpose of adding strength to the bracket, it also functions to partially enclose the control box. Rib 41 extends downwardly beyond the bottom edge of partial front face 36, its purpose being discussed later therein. Lateral ridges 42 and 43 extend around all three sides of the bracket for added strength. Note also that the top edges of the control box are confined by lateral ridge 42, thereby allowing only upward motion of the bracket once secured to the thermostat. Rib 44 projects upwardly a short distance from the right side of lower ridge 43. As shown in FIGS. 6 and 7, a leaf spring 45 is attached at one end to right side 35 of the bracket and angles outwardly toward the rear of the bracket.

Controller housing 16 is shaped and configured to mate with mounting bracket 15 in such a manner that it locks onto the thermostat control box, preventing even upward relative motion of the bracket. It is prevented from vibrating loose from the bracket and in turn prevents the bracket from vibrating loose from the thermostat housing. Housing 16 is formed with ridges 46 and 47 aesthetically matching the appearance of similar ridges on the bracket. Top shoulder 51 slides beneath the overhang of the right side of ridge 42 of the bracket so that the top surface of ridge 42 and the housing are flush when mounted together. An undercut slot 52 is formed by outwardly projecting shoulder 53 and downwardly projecting ridge 54 as best shown in FIG. 6. When the controller housing is slid onto mounting bracket 15, upwardly projecting rib 44 slides into slot 52 to firmly anchor the top portion of the housing to the bracket.

At the bottom of the housing is laterally projecting ridge 55 parallel and spaced from shorter rib 56. Upwardly projecting rib 57 extends from ridge 55 and is perpendicular to and spaced from rib 56. Upon mounting the housing to the bracket, downwardly projecting rib 41 is closely confined between ribs 56 and 57 thereby securing the bottom portion of the housing and bracket together in a positive manner.

Referring to FIGS. 6 and 7, in order to prevent possible motion of the housing with respect to the bracket over a period of time, leaf spring 45 engages the left side 61 of the housing to provide a continuous bias of the housing away from the bracket. Additionally, the rearward end 62 of the leaf spring snaps in behind the chamfered forward facing edge of rib 63 so that the housing is essentially locked in place on the mounting bracket when fully engaged. However, because of the chamfer, it is possible by applying a specific back to front force on the housing for the end of the leaf spring to ride up over rib 63 and allow the housing to slide forward. It is possible that the leaf spring could be mounted on the controller housing, and that it could function effectively without the rib on the opposite unit.

With further reference to FIG. 6, it can be seen that rib 57 has a dual purpose. Not only does it confine the lower end of the right side of the bracket terminating in rib 41, it also provides an abutment adjacent the bottom of control box 11. With the bracket and housing mutually engaged and mounted on the control box, it is impossible to remove the assembly from the control box without first removing the housing from the bracket. This prevents the accidental misalignment or removal of the control apparatus due to vibration or other external forces without intentionally disconnecting its parts. In the vicinity of upper notch 52 formed by ribs 53 and 54 and lower rib 57 are facing portions 64 and 65 (FIG. 3). These provide a positive stop for positioning of the housing with respect to the bracket as the forward ends of ribs 44 and 41 respectively abut the inner surfaces of these facings. Once properly installed, the front surfaces of the bracket and the housing will be substantially flush with each other.

Figure 4:
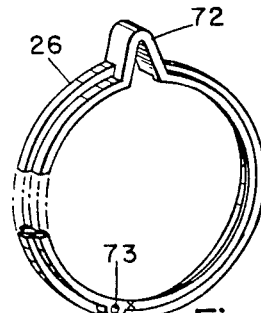
FIG. 4 is a perspective partially cut away view of the drive ring of FIG. 1.

For safety purposes, drive ring 26 as shown in FIG. 4 is adapted to slide over control knob 12 in an axial direction and frictionally engage it. However, it is specifically designed to rotationally or circumferentially slide with respect to the control knob if it is not properly angularly positioned and the control knob is driven to the high end stop by the control means of this invention. By being able to slide on the knob when the latter is at a stop, or rotate the knob when the knob is free to rotate, the drive ring automatically positions itself properly even if it is initially installed improperly with respect to the control knob. This feature prevents the thermostat control from going to a dangerously high setting. One type of control knob is configured with a circumferential area 66 labelled "HOT", a longer circumferential area 67 labelled "WARM" and a normal indicator segment 71. The radial projection 72 of drive ring 26 is designed to be aligned with the normal position 71. Projection 72 has a dual function in that it also offers a size adjusting resiliency for the ring to be forced over the rim of knob 12. Drive ring 26 is also formed with a bore 73, the purpose of which will be explained below.

Drive arm 27 couples crank 21 with drive ring 26 by means of pins 31 and 32. For proper orientation of the crank and the drive arm with respect to the drive ring, each of these three elements has labels "O" and "X" so that the appropriate size pins of the drive arm are matched for proper operation of the apparatus. Thus at end 74 of the drive arm appears an "O" indicating that pin 32 fits in the "O" bore 24 in the crank. Likewise, end 75 of the drive arm has an imprint of an "X" indicating that pin 31 is adapted to fit into the mating "X" bore 73 of drive ring 26. As shown more clearly in FIG. 3, the "X" opening and "X" pin are larger than the corresponding "O" opening and "O" pin.

In operation, from the position shown on FIG. 1, counterclockwise rotation of the crank will cause counterclockwise rotation of drive ring 26 and consequently control knob 12 toward the lower or warm setting of the thermostat. The motor in housing 16 is designed, in conjunction with the system shown in FIG. 9, to rotate approximately 180° before stopping. At that point, the drive arm will have moved to the right and the thermostat will be at a low setting. When it is necessary to heat the water in the water heater, the motor again rotates approximately 180° in a counterclockwise direction but this time because of the relative positions of the crank, drive arm and drive ring, the control knob rotates in a clockwise direction resulting in a hotter setting of the thermostat.

Figure 8:
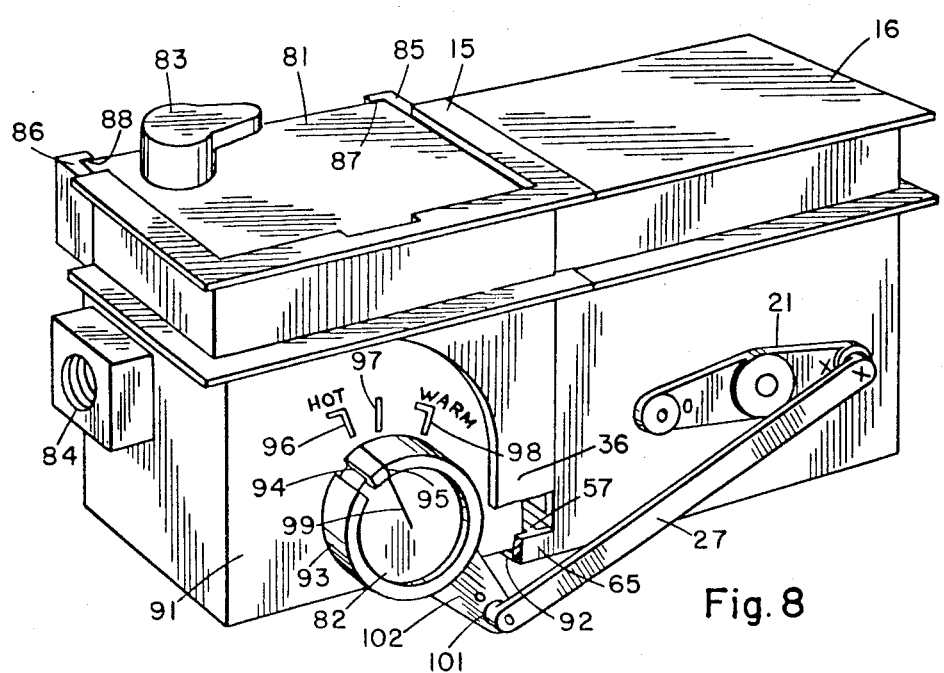
FIG. 8 is a perspective view similar to FIG. 1 with the apparatus mounted to a second type of thermostat control box.

The same apparatus as shown in FIG. 1 is shown in FIG. 8 but mounted to a thermostat control box 81 of somewhat different dimensions than control box 11. Thermostat 81 has control knob 82 and pilot apparatus 83 along with a connector 84 for the fuel supply. Because thermostat control box 81 is deeper front to back, slightly larger top to bottom and slightly narrower left to right, there are differences in the way the apparatus of this invention fits with respect to that box. Extensions 85 and 86 (FIGS. 1, 2 and 8) of the mounting bracket are provided with shoulders 87 and 88 which engage the rear vertical corners of housing 81. The forward corners of the control box are within the front portion of the bracket and the front face 91 of the thermostat is flush against the inside surface of the front 33 of the bracket. The lower end of the thermostat control box extends somewhat below the bottom of front face 36 and rib 57 resides between lower projecting rib 41 and the lower right corner of that control box. To prevent removal of the apparatus from the thermostat without first removing controller housing 16, shoulder 92 on lateral ridge 55 abuts and confines the lower edge of the control box and prevents removal of the bracket from the thermostat. Otherwise the connection between the thermostat, the bracket and the housing is the same as described above with respect to thermostat 11 in FIG. 1.

Figure 2:
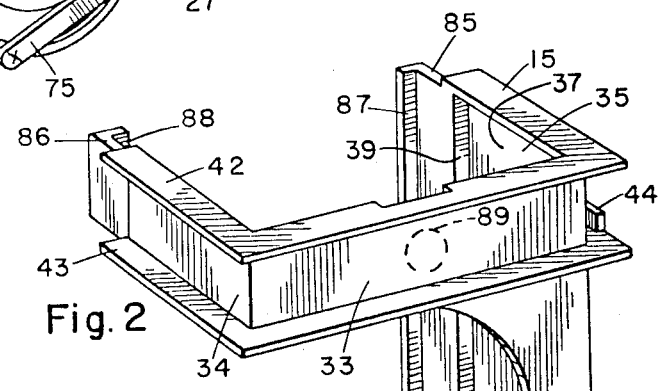
FIG. 2 is a perspective view of the mounting bracket shown in FIG. 1.

To accommodate minor tolerance variations in the size of the thermostat control box, bracket 15 is formed with a take-up button 89 on the inside surface of front 33 (FIGS. 2 and 5). This ensures a snug fit of the bracket onto the box. If the bracket is properly sized, a slight outward flexing of the front will occur when the bracket is mounted on the thermostat. If there is some element of play, the button will take up the additional space for a tight fit.

Control knob 82 is substantially smaller than the control knob shown in FIG. 1 and has a somewhat different configuration drive ring. Where radial projection 72 allows the necessary expansion of drive ring 26 for engaging knob 12, drive ring 93 is formed with a gap 94 which allows the circumferential flexibility necessary for fitting onto the thermostat knob. Of course, either ring may use either or both adjustment configurations. Ring 93 is provided with positioning indicia 95 corresponding with setting position indicator line 99 on the knob and being selectively aligned with the "HOT", normal and "WARM" positions 96, 97 and 98 of thermostat 81. In order to accommodate the different knob sizes bore 101 designated by a "O" is positioned on radially extending tab 102 so that the radial distance of bore 101 from the knob axis for connection with drive arm 27 is substantially the same as the radial distance of bore 73 from the axis of control knob 12 in FIG. 1.

In the position shown in FIG. 8, the thermostat is at a "HOT" setting and counterclockwise rotation of crank 21 provides clockwise rotation of knob 82 to return it to a lower setting. When the "WARM" position has been reached, subsequent substantial demand for hot water will cause the motor to rotate once again in the counterclockwise direction for approximately 180° causing counterclockwise rotation of control knob 82 and returning it to the "HOT" setting.

Figure 9:
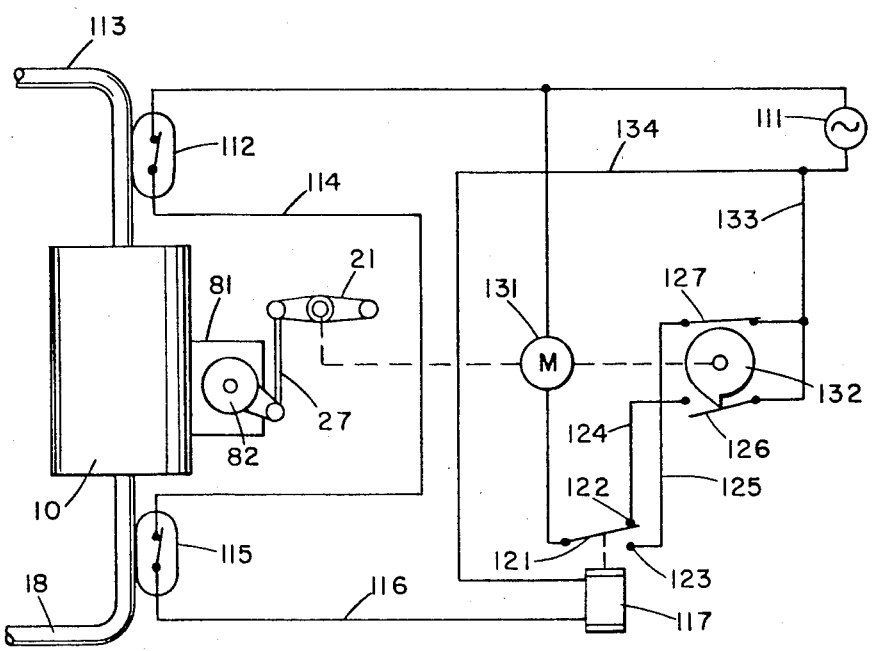
FIG. 9 is a schematic of a system with which the present invention may be employed.
Figure 10:
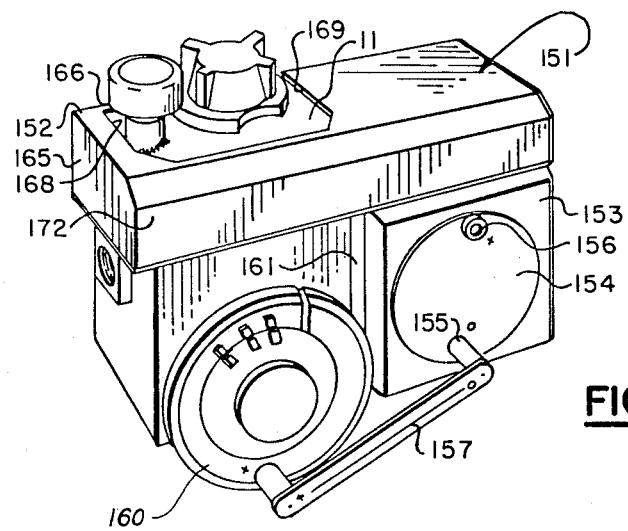
FIG. 10 is a perspective view of an alternative embodiment of the invention mounted to a thermostat of the first configuration.
Figure 11:
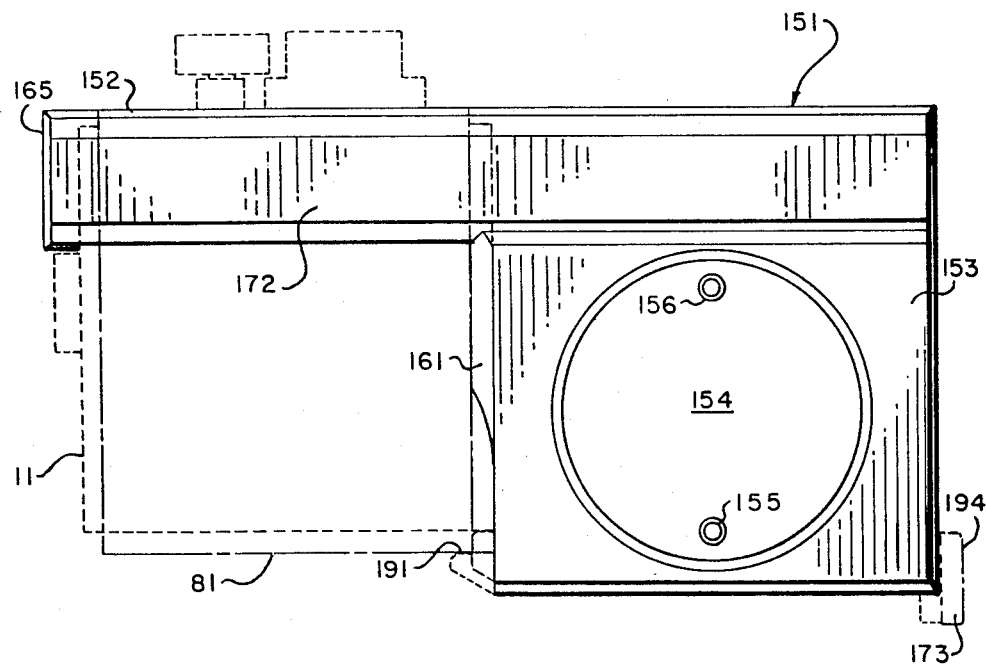
FIG. 11 is a front view of the embodiment of FIG. 10 showing in dotted and dashed lines the manner of coupling to thermostats of both configurations.

FIG. 9 is an exemplary schematic diagram of a control system with which the apparatus of this invention may be adapted to work. AC power supply 111 provides the necessary electrical power, which may be stepped down by an appropriate transformer (not shown), to the system voltage, typically 24 volts AC. One side of the power supply is connected to thermostatic switch 112 which, in this configuration, is preferably a reed switch simply positioned on the side of the outflow pipe 113 by suitable means. Switch 112 is connected by means of wire 114 to supply side thermostatic switch 115, also preferably a thermally controlled reed switch in this configuration. Switch 115 is mounted to inflow pipe 18 supplying water heater tank 10. Switch 115 is electrically connected by means of wire 116 to coil or solenoid 117 controlling switch 121 between contacts 122 and 123. These contacts are connected in turn by means of wires 124 and 125 respectively to switches 126 and 127 controlled by motor 131 and cam assembly 132. Both of these switches are connected by means of wire 133 to the other side of power supply 111. That same side of power supply 111 is connected by means of wire 134 to the other side of solenoid 117. Motor 131 is connected between the first side of the power supply and switch 121 which is controlled by solenoid 117. The motor is connected to crank 21 which in turn is connected to thermostat knob 82 by means of drive arm 27.

Any system sensitive to the outflow, or to both outflow and supply lines of the water heater, to control motor 131, can be employed with the apparatus of the present invention to change the temperature setting of the thermostat. Thus the particular circuitry shown in FIG. 9 is not critical to the present invention, but is shown for expository purposes. With minor modifications the reed thermostatic switches can be replaced by other switches at these or other locations, or even by different types of sensors which provide the inputs necessary for the system to respond to demand for heating water in the tank. The thermo switches shown are externally mounted, but internally mounted sensors actuated by heat, pressure or flow rate, or a combination of such sensors may be used to provide the information to which the control circuit responds.

It should be noted that if mounting bracket 15 is to be used with thermostat housing 11, rearward extensions 85 and 86 can simply be snapped off because they have no function in that situation. However, they could be left on as they do not interfere with the thermostat and its operation.

The embodiment shown in FIGS. 10-16 has the same purposes and functions in the same manner as the embodiment described above. One primary difference is that the bracket and controller housing are formed as a unitary housing element. It still is adapted to function with the two different thermostats previously considered and it is secured to the thermostat control box by a novel locking arrangement.

Unitary housing 151 has top bracket portion 152 adapted to engage a thermostat control box. Portion 153 houses the motor and the control apparatus. Instead of an elongated crank, the embodiment of FIG. 10 employs a disc 154 having "O" and "X" bores 155 and 156, respectively, similar to bores 24 and 25 shown in FIG. 3. The operation, with drive arm 157, is as previously described. Drive ring 160 is similar in configuration and function to drive ring 93 of FIG. 8.

When housing 151 is mounted to thermostat 11, a portion 161 of the front face of the housing slightly overlaps the front face of the thermostat. Likewise, a portion 162 of back cover 163 (FIG. 12) slightly overlaps the rear face of the thermostat control box thereby enclosing the entire right end of the control box and preventing fore and aft relative motion. Left and right top flanges 168 and 169 slightly overlap the top of the control box to prevent further downward movement of the bracket after being properly positioned. A retainer 164 in the left end 165 of the housing has a tab 166 engaging the left rear corner of the control box 11. Thus it can be seen that housing 151 is mounted to thermostat 11 substantially in the manner shown in FIG. 5.

An adaptor or spanner 167 (FIG. 12) partially adapts housing 151 to thermostat 81, which is somewhat taller, narrower and deeper than thermostat 11. When the housing is mounted to this thermostat, the front and rear face portions 161 and 162 do not overlap the thermostat but the housing is positively retained in engagement with thermostat 81 by means of take up rib 170 on the inside surface of left front extension 172 of the housing and take up rib 171 in spanner 167.

The locking arrangement for firmly fixing the housing to the thermostat so that it cannot be accidentally dislodged or vibrated out of position is shown in FIGS. 11 and 14-16. The locking means comprises a slider 173 having laterally extending ridges 174 and 175 adapted to engage slots 176 and 177 in the housing body and in back cover 163 respectively. Arcuate detents 181 and 182 on respective springloaded arms 183 and 184 are adapted to engage pins 185 and 186 arranged in pairs respectively in slot 176 in the housing and in slot 177 in the back cover. The arcuate detents 181, 182 engage either pins 185 or 186 depending on whether the housing is mounted to thermostat 11 or 81. When the housing is mounted to thermostat 11, abutment 191 engages the bottom right hand corner of the thermostat, thereby locking the housing in place so that there is no possibility of the housing becoming dislodged nor can it be removed from the thermostat without removing lock slide member 173. Note that abutment 191 is provided with a chamber 190 to enable the slider to engage a thermostat 11 with tolerances on the large side. Slots 187 and 188 have a dual function. They permit spring action of detents 181, 182 as they engage and disengage pins 185, 186, and at the same time provide sufficient flex to front portion 189 of the slider to allow abutment 191 to positively engage a slightly enlarged thermostat control box. Abutment 192 engages thermostat 81 in similar manner, it being formed with chamfer 193. The flex action of front portion 189 functions as discussed above when the slider is moved further to engage the lower end of thermostat 81 and detents 181,182 engage pins 186. Both abutments 191 and 192 are interrupted by notch 197. This is to accommodate a projection on the thermostat control box, allowing the two abutment portions to bypass the projection to engage the bottom right corner of the control box. Slider 173 is prevented from being removed from the housing by gaps 197, 198 in ridges 174, 175 respectively, which allow limited sliding motion in cooperation with tab 199 in housing slot 176. A similar tab may be formed in slot 177 in the back cover. Alternatively, other stop means may be employed to prevent undesired removal of the slider from the housing.

The sliding lock member has a handle element 194 at the end opposite abutments 191 and 192. This handle is pushed when the lock is engaged and can be pulled out by engaging inner shoulder 195. The detents can be disengaged from pins 185, 186 by pulling or pushing on the slider with sufficient force. While that force is not large, the detents must engage positively to prevent dislocation due to accidental contact or vibration. The outer smooth surface 196 of the handle provides a location for a label or legend with respect to operation of the locking member.

One particular advantage of both embodiments of the present invention is that it can be used to convert present installations of thermostat controls for hot water heaters without the use of any tools. The circuitry and motor are all enclosed within controller housings 16 and 153, the bracket and drive rings are easily slid onto the appropriate portions of the existing thermostat and the thermostatic switches 112 and 115 (FIG. 9) can be simply taped, snapped or bracketed onto the appropriate water pipes. The only thing necessary would then be to plug the unit into a source of normal electrical current. There is no need to modify or in any way convert the basic thermostat unit in order to function properly with the present invention.

Another significant advantage of this invention is that the water heating system tends to go to a low setting at all times, the objective being to keep the thermostat low or off except when there is a specific requirement for a significant amount of hot water. Still another advantage of this system is in its safety aspects. It cannot drive the thermostat too high because when it hits the high stop of the thermostat control the drive ring slips rotationally on the control knob. Further, if the control knob should become frozen and prevented from rotating, the motor will simply stall without in any way damaging it.

From the above description it should be clear that with certain modifications to the mounting bracket, drive arm, crank and slip ring or other means for connecting to the thermostat control, the present apparatus can accommodate a large number of different water heater thermostat configurations. An elongated control bar instead of a knob could also be accommodated by the present system.

The present invention, as disclosed, is particularly useful in that it is adaptable to two different sizes of thermostat control box, merely by minor adjustments to the control apparatus elements.

The above description applies particularly to gas fired hot water heaters. However, the principles of the invention supply equally to any type of heat source, including oil and electric, that is controllable by an externally accessible device.

To summarize in simple terms, the apparatus operates as follows. Assuming that the water heater is full of hot water and that no hot water is being drawn, the system is in a "shut down" mode. The thermostat has been turned, by the drive motor, to the low position. In order for the system to be activated and turn the thermostat to the high setting to heat water, two conditions must be satisfied. First, there must be a draw or use of hot water and, second, the hot water available in the water heater tank and flowing out of the hot water pipe must be below a predetermined temperature. The system is normally at either the full on (high) or full off (low) position, resulting in substantial fuel savings.

Under these operating parameters, a number of conditions may occur. These are:

1. Short hot water draw. The user draws a small amount of hot water, say to rinse some dishes. The cold water sensor will immediately activate upon the inflow of cold water, but as long as the outgoing hot water temperature exceeds its preset limit, the total system will not activate and fire up the hot water heater. This condition may exist over a number of small hot water draws. The system will not activate the thermostat control until the outgoing hot water temperature falls below the preset temperature. The control system is designed with a built-in delay to permit a limited number of short draws of hot water before it will operate to reheat the water in the tank.

2. No hot water draw over an extended period. Over extended periods of no hot water usage, which may in some cases be only overnight, but which will more normally be weekends away from home, the water temperature in the hot water heater will fall below the preset minimum, typically 100° F. Under this condition, the system will not activate but the water heater will fire to maintain the minimum temperature. The hot water sensor will activate because the hot water temperature is down, but the cold water sensor will not activate because there is no water use and, therefore, the thermostat setting will remain in the low position. As soon as hot water is drawn and cold water enters the system, the cold water sensor will activate and the entire system will sequence to move the thermostat into the "HOT" position, thus heating the water in the hot water tank up to the present high setting.

3. Normal hot water usage. Under more normal hot water use, such as showers, dishwasher operation, clotheswasher operation, etc., the system will operate as follows. Immediately upon use of hot water, the cold water sensor will sense incoming cold water and activate. As hot water is used, the water temperature in the hot water tank will drop due to the inflow of cold water. As soon as the outgoing hot water reaches the predetermined minimum temperature, the hot water sensor will also activate and the entire system will then operate to move the thermostat control from low to high, thus firing the hot water heater. Once the hot water draw stops, thus stopping the inflow of cold water, the cold water sensor will almost immediately deactivate. When the water in the tank reaches its predetermined temperature, the hot water sensor will then also deactivate and the system will return the thermostat control to the low position.

In view of the above description, it is likely that modifications and improvements will occur to those skilled in the art which are within the scope of the accompanying claims.

What is claimed is:

1. Apparatus for controlling a thermostat, said thermostat having a control box and an externally accessible, rotatable control element, said apparatus comprising:
   a unitary housing comprising:
      a mounting bracket adapted to removably slide over and at least partially enclose said thermostat control box; and
      a controller housing;
   a motor in said controller housing having an externally accessible shaft;
   crank means mounted to said shaft for rotation therewith;
   drive means engaging the thermostat control element; and
   an elongated drive arm removably and rotatably coupled at one end to said crank means and to the other end to said drive means, whereby rotation of said crank means changes the setting of the thermostat.

2. The apparatus recited in claim 1 and further comprising:
   means for preventing said bracket from being removed from the thermostat when mounted thereto.

3. The apparatus recited in claim 2 wherein said means for preventing removal of said bracket from the thermostat comprises a ridge extending laterally from said controller housing and underlying the thermostat control box.

4. The apparatus recited in claim 3, wherein said means for preventing removal of said bracket from the thermostat comprises locking means, said locking means comprising:
   a slide element slidably engaging said controller housing;
   cooperative detent means on said slide element and on said controller housing to retain and slide element in its engaged position.

5. The apparatus recited in claim 4 wherein said detent means comprises spring loaded arms.

6. The apparatus recited in claim 4 wherein said locking means comprises means on one end adapted to engage the thermostat control box when said detent means are engaged.

7. The apparatus recited in claim 4 wherein said locking means comprises handle means on the other end for pushing said slide element into place and pulling said slide element from its engaged position.

8. The apparatus recited in claim 6, wherein said locking means comprises one element adapted to engage a thermostat of a first configuration and a second element adapted to engage a thermostat of a second configuration.

9. The apparatus recited in claim 8, wherein said detent means comprises alternative positions, one position being employed with the thermostat of said first configuration and the other position being employed with the thermostat of said second configuration.

10. The apparatus recited in claim 1, wherein said mounting bracket is formed with a pair of spaced forward facing shoulders adapted to engage the rear corners of a thermostat of a first configuration.

11. The apparatus recited in claim 1, and further comprising an adaptor element connected to the rear portion of said mounting bracket adapted to engage the rear portion of a thermostat of a second configuration.

12. The apparatus recited in claim 10, and further comprising an adaptor element removably connected to said shoulders of said mounting bracket, said adaptor element being adapted to engage the rear portion of a thermostat of a second configuration.

* * * * *

UNITED STATES PATENT AND TRADEMARK OFFICE
CERTIFICATE OF CORRECTION

PATENT NO. : 4,549,159

DATED : October 22, 1985

INVENTOR(S) : JAMES B. MCGHEE AND THOMAS D. TWEEDIE

It is certified that error appears in the above-identified patent and that said Letters Patent are hereby corrected as shown below:

Column 10, line 49, change the word "and" to --said--.

Signed and Sealed this

Eighteenth Day of February 1986

[SEAL]

Attest:

DONALD J. QUIGG

Attesting Officer

Commissioner of Patents and Trademarks